April 12, 1938.  W. H. BASELT  2,113,958
BRAKE ARRANGEMENT
Filed Jan. 23, 1935  3 Sheets-Sheet 1

Inventor:
Walter H. Baselt,
By Wilkinson, Huxley, Byron & Knight
Attys.

April 12, 1938.    W. H. BASELT    2,113,958
BRAKE ARRANGEMENT
Filed Jan. 23, 1935    3 Sheets-Sheet 3

Inventor:
Walter H. Baselt

Patented Apr. 12, 1938

2,113,958

UNITED STATES PATENT OFFICE 2,113,958

BRAKE ARRANGEMENT

Walter H. Baselt, Chicago, Ill., assignor to American Steel Foundries, Chicago, Ill., a corporation of New Jersey Application January 23, 1935, Serial No. 3,113

9 Claims. (Cl. 188—56)

This invention relates to car trucks and more particularly to brake mechanism for railway cars.

It is an object of this invention to provide a four wheel truck for use with high speed articulated trains wherein a pair of cylinders is used to operate clasp brakes provided on said truck.

Another object of the invention is to provide a brake arrangement for a low center of gravity truck wherein unit cylinder brake operating means is utilized.

Yet another object is to provide a brake arrangement adapted for use on trains of the high speed type wherein positive and effective braking must be provided.

A further object is to provide clasp brakes for a car truck, the brakes for each wheel and axle assembly being operated by unit cylinder means provided on the load carrying member of the truck between the spaced wheels of each wheel and axle assembly.

Another different object is to provide brakes for a high speed type truck where limited clearance conditions prevail, and which fulfill all conditions of manufacture and service, and are inexpensive to make and maintain.

With these and various other objects in view, the invention may consist of certain novel features of construction and operation as will be more fully described and particularly pointed out in the specification, drawings and claims appended hereto.

In the drawings, which illustrate one embodiment of the device and wherein like reference characters are used to designate like parts—

In view of the fact that the arrangement on either side of the longitudinal center of the truck is symmetrical, it will suffice to describe the mechanism on one side thereof.

Figure 1:
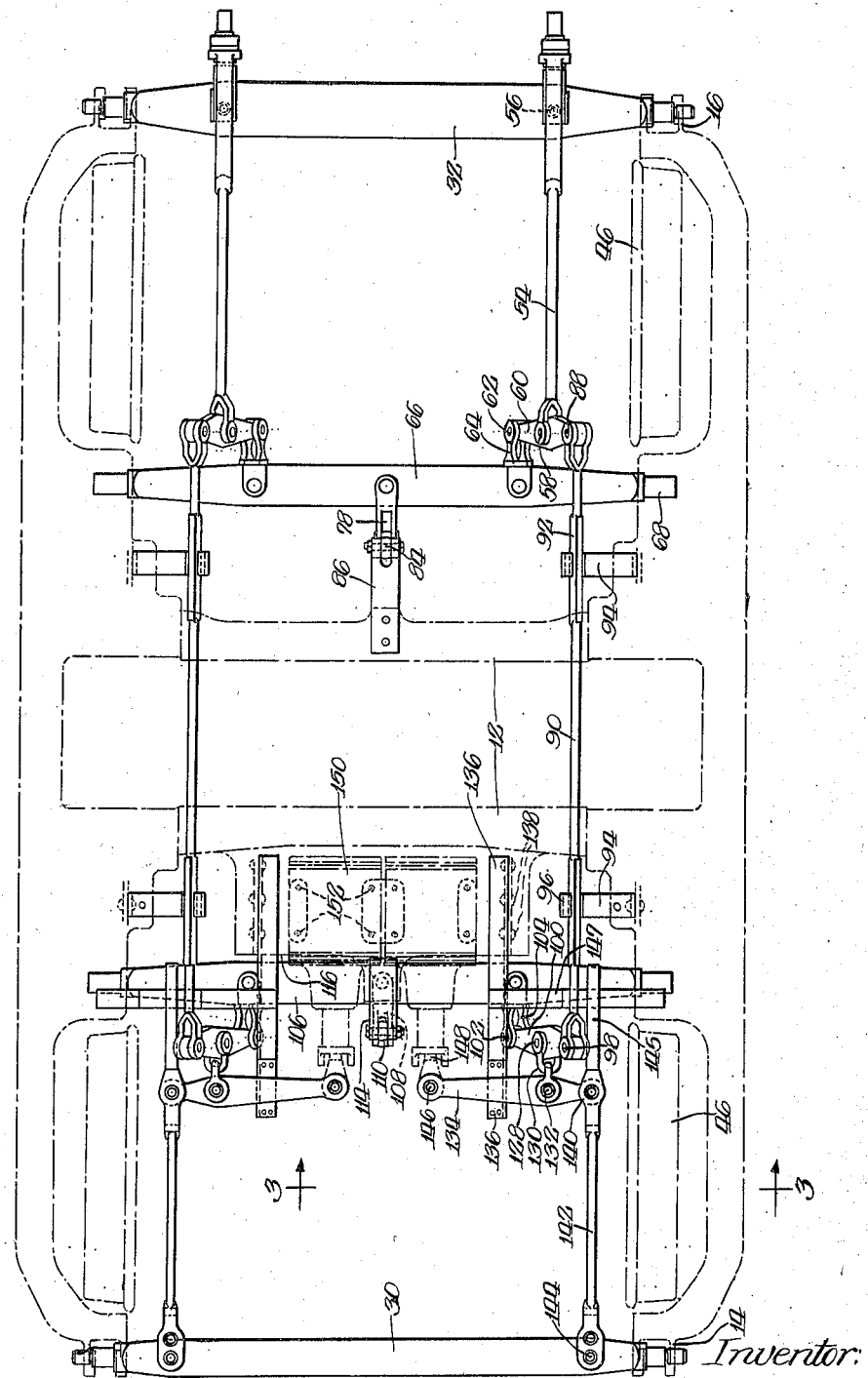
Figure 1 is a fragmentary top plan view of a railway car truck having applied thereto a brake arrangement embodying the invention.
Figure 2:
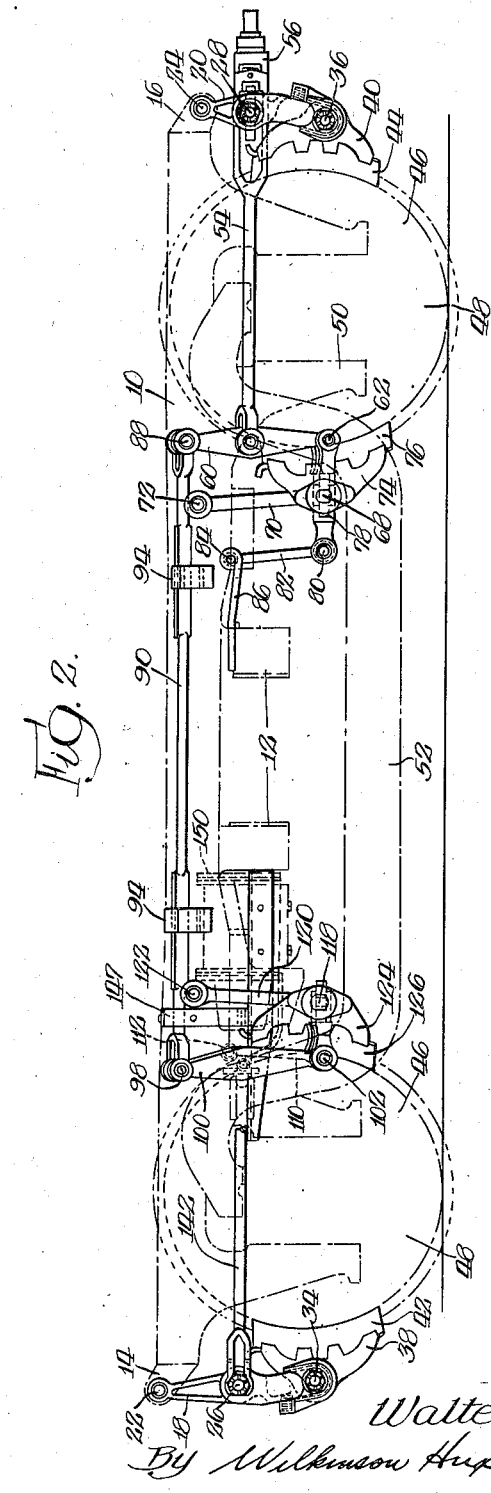
Figure 2 is a side elevation of the truck and brake arrangement therefor shown in Figure 1.
Figure 3:
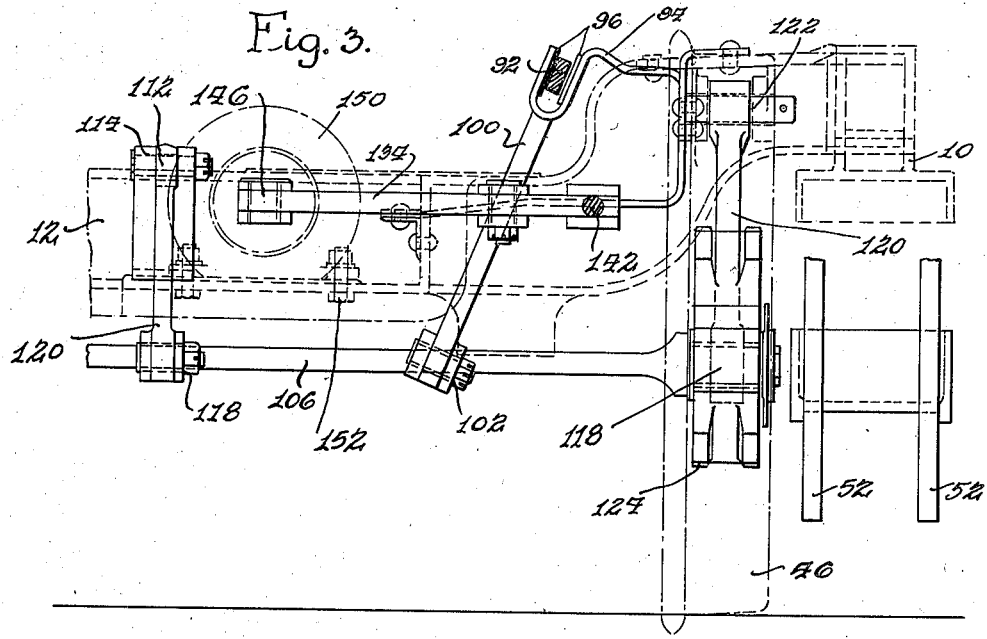
Figure 3 is a transverse fragmentary sectional elevation taken substantially in the plane as indicated by the line 3—3 of Figure 1.
Figure 4:
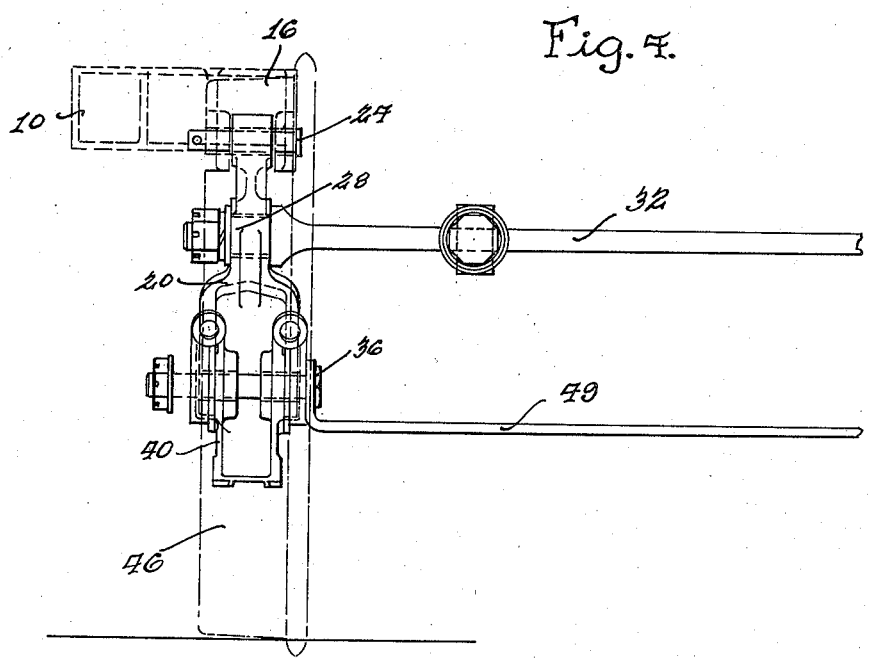
Figure 4 is a fragmentary end elevation of the arrangement of the truck, the same being taken substantially at the right end of Figure 2.

The truck illustrated includes a truck frame having side frame members 10 integrally connected by transoms 12 spaced apart to accommodate a bolster (not shown). The side frames 10 are provided at the ends thereof with inwardly extending brackets 14 and 16 to which the end brake hanger levers 18 and 20 are pivotally connected as at 22 and 24, the pairs of brake levers on opposite sides of the truck being pivotally connected as at 26 and 28 to the hanger lever connectors 30 and 32. The lower ends of the brake hanger levers 18 and 20 are pivotally connected as at 34 and 36 to the brake heads 38 and 40, said brake heads being provided with the brake shoes 42 and 44 adapted to have braking cooperation with the periphery of the wheels 46 of the wheel and axle assemblies 48. The brake heads 38 and 40 on opposite sides of the truck are connected at the pivots 34 and 36 with the tie bars 49, such as shown in Figure 4. These pivot points are offset above the centers of the brake heads on one side of each wheel and below the centers of the brake heads on the opposite side of each wheel to insure equal wear over the entire surfaces of the associated brake shoes, as is more fully described in my pending application Serial No. 555,207, filed August 5, 1931.

The journal ends of said wheel and axle assemblies are adapted to have cooperative relation with the usual journal boxes (not shown), said journal boxes being slidably received in the spaced pedestal jaws 50 of the side frame, the equalizer 52 being disposed between the spaced journal boxes. The hanger lever connector 32 is connected to the slack adjuster rod 54 through the slack adjuster 56, the slack adjuster rod being disposed inwardly of the adjacent wheels 46, the inner end of said rod being pivotally connected as at 58 to the truck lever 60, the lower end of said truck lever 60 being pivotally connected as at 62 to the fulcrum 64 secured to the brake beam 66. The brake beam 66 is pivotally connected adjacent the outer end thereof as at 68 to the brake hanger 70, said brake hanger being pivotally supported as at 72 adjacent the upper end thereof to the side frame. The brake beam 66 is also pivotally connected as at 68 to the inner brake head 74 provided with the brake shoe 76 adapted to have braking cooperation with the periphery of the wheel 46.

The brake beam 66 is provided adjacent the longitudinal center line of the truck with the balance hanger fulcrum 78 pivotally connected as at 80 to the balance hanger 82, said balance hanger being pivotally connected as at 84 to the balance hanger bracket 86 provided on one of the transoms 12. The upper end of the truck lever 60 is pivotally connected as at 88 to the pull rod 90, the pull rod 90 being provided with the flattened or guiding portions 92 adapted to be embraced by the pull rod brackets 94, said brackets being secured to and carried by the truck frame adjacent the transom 12 and provided with liners 96 to reduce noise, said liners being made, for example, of non-metallic material.

The other end of the pull rod 90 is pivotally connected as at 98 to the upper end of the truck lever 100, the lower end of said truck lever 100 being pivotally connected as at 102 to the fulcrum 104 secured to the inner brake beam 106. Said brake beam 106 is provided with the balance hanger fulcrum 108 disposed substantially on the longitudinal center line of the car to which the lower end of the balance hanger 110 is pivoted, the upper end of said balance hanger being pivotally connected as at 112 to the bracket 114 secured to the cylinder bracket 116 provided on the other transom 12.

The outer end of the brake beam 106 is pivotally connected as at 118 to the lower end of the brake hanger 120, the upper end thereof being pivotally supported as at 122 to the side frame. The brake beam 106 is also pivotally connected as at 118 to the inner brake head 124 provided with the brake shoe 126 adapted to have braking cooperation with the periphery of the other wheel 46. The truck lever 100 is pivotally connected intermediate the ends thereof as at 128 to the clevis 130, said clevis being pivotally connected as at 132 to the substantially horizontally disposed cylinder lever 134, said cylinder lever being slidably supported on the bracket 136 secured to the cylinder 116 as at 138.

The outer end of said cylinder lever 134 is pivotally connected as at 140 to the pull rod 142 disposed inwardly of the wheel 46 and being pivotally connected as at 144 to the hanger lever connector 30. The pull rod 140 is provided with an extension 145 extending inwardly toward the transom 12 and is slidably supported on the strap or pull rod support 147 disposed between the side frame 10 and the bracket 136. The inner end of said cylinder lever 134 is pivotally connected as at 146 through a substantially universal connection to the piston rod 148 of one of the brake cylinders 150, said cylinder being one of a pair of cylinders disposed at opposite sides of the longitudinal center lines of the truck and secured as at 152 to the cylinder bracket 116 above said bracket.

The pair of cylinders operate similar brake rigging at opposite sides of the truck, and each operates toward the same end of the truck, each being supported on the single cylinder bracket 116.

With such an arrangement very limited clearance conditions are met, and a brake rigging is provided to adequately control the movements of a truck for a high speed train, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a railway car truck, a supported brake cylinder, a horizontally extending cylinder lever operatively connected to the piston of said cylinder, an inclined brake lever located within the confines of said truck operatively connected to said cylinder lever for transmitting braking actions, and another brake lever disposed in the plane of the adjacent wheel and located on the opposite side of said cylinder lever and operatively connected thereto for transmitting braking actions, the connections to said brake levers being intermediate the ends thereof.

2. In a brake arrangement, the combination of a railway car truck, a pair of brake cylinders supported thereby and located on opposite sides of the longitudinal center of said truck, a cylinder lever on each side of the truck operatively connected to the piston of its brake cylinder, an inclined brake lever, one on each side of said truck and operatively connected to its associated cylinder lever for transmitting brake actions, and a brake lever one on each side of said truck disposed in the plane of the adjacent wheel and operatively connected to its associated cylinder lever for transmitting braking actions, the connections to said brake levers being intermediate the ends thereof.

3. In a brake arrangement, the combination of a truck frame, a wheel disposed in supporting relation to said frame, brake heads on each side of said wheel, a dead brake hanger lever pivotally connected adjacent the upper end thereof to said truck frame and adjacent the lower end thereof to one of said brake heads, said hanger lever being disposed in the plane of said wheel, a live truck lever disposed on the opposite side of said wheel from said hanger lever and inwardly of the plane of said wheel, the lower end of said truck lever being connected to said other brake head, a cylinder supported on said truck frame inboard of said truck lever, a substantially horizontally disposed cylinder lever pivoted adjacent the inner end to the piston of said cylinder, a direct pivotal connection between said cylinder lever and truck lever, and a pull rod pivotally operatively connected to said hanger lever intermediate the ends thereof and to the outer end of said cylinder lever.

4. In a brake arrangement, the combination of a truck frame having a load carrying member, spaced wheel and axle assemblies for supporting said frame, a pair of brake cylinders located one on each side of the truck and supported by said load carrying member and having the pistons thereof disposed inwardly of one of the axles of said assemblies, brakes on each side of the truck, a live and dead brake lever on each side of the truck operatively connected to their associated brakes, a cylinder lever operatively connected to each of said cylinders and being operatively connected to its associated live and dead brake levers, said cylinder levers being disposed immediately adjacent certain of said brake levers, and means for effecting a direct connection between said immediately adjacent levers.

5. In a brake arrangement, the combination of a truck frame, a pair of brake cylinders supported thereby and located one on each side of the longitudinal center of said truck, brakes on each side of the truck, a live and a dead brake lever on each side of the truck operatively connected to their associated brakes, a cylinder lever operatively connected adjacent its end with each of said cylinders and being operatively connected to the associated live and dead brake levers, said cylinder levers being disposed immediately adjacent certain of said brake levers, means for effecting a direct connection between said immediately adjacent levers intermediate the ends thereof, said last-named brake levers being connected adjacent their ends to the associated brakes.

6. In a brake arrangement, the combination of a truck frame having a load carrying member, spaced wheel and axle assemblies for supporting said frame, a pair of brake cylinders located one on each side of the truck and supported by said load carrying member and having the pistons thereof disposed inwardly of one of the axles of said assemblies, brakes on each side of the truck, a live and dead brake lever on each side of the truck operatively connected to their associated brakes, a cylinder lever operatively connected to each of said cylinders and being operatively connected to its associated live and dead brake levers, said cylinder levers being disposed immediately adjacent certain of said brake levers, and means for effecting a direct connection between said immediately adjacent levers intermediate the ends thereof, said last-named brake levers being connected adjacent their ends to the associated brakes.

7. In a brake arrangement, the combination of a truck frame having a load carrying member, spaced wheel and axle assemblies for supporting said frame, a pair of brake cylinders located one on each side of the truck and supported by said load carrying member and having the pistons thereof disposed inwardly of one of the axles of said assemblies, brakes on each side of the truck, a live and dead brake lever on each side of the truck operatively connected to their associated brakes, said dead brake levers being disposed in the plane of the adjacent wheel, a cylinder lever operatively connected to each of said cylinders and being operatively connected to its associated live and dead brake levers, said cylinder levers being disposed immediately adjacent certain of said brake levers, and means for effecting a direct connection between said immediately adjacent levers.

8. In a brake arrangement, the combination of a truck frame, a pair of brake cylinders supported thereby and located one on each side of the longitudinal center of said truck, brakes on each side of the truck, a live and a dead brake lever on each side of the truck operatively connected to their associated brakes, said dead brake levers being disposed in the plane of the adjacent wheel, a cylinder lever operatively connected adjacent its end with each of said cylinders and being operatively connected to the associated live and dead brake levers, said cylinder levers being disposed immediately adjacent certain of said brake levers, means for effecting a direct connection between said immediately adjacent levers intermediate the ends thereof, said last-named brake levers being connected adjacent their ends to the associated brakes.

9. In a brake arrangement, the combination of a truck frame having a load carrying member, spaced wheel and axle assemblies for supporting said frame, a pair of brake cylinders located one on each side of the truck and supported by said load carrying member and having the pistons thereof disposed inwardly of one of the axles of said assemblies, brakes on each side of the truck, a live and dead brake lever on each side of the truck operatively connected to their associated brakes, said dead brake levers being disposed in the plane of the adjacent wheel, a cylinder lever operatively connected to each of said cylinders and being operatively connected to its associated live and dead brake levers, said cylinder levers being disposed immediately adjacent certain of said brake levers, and means for effecting a direct connection between said immediately adjacent levers intermediate the ends thereof, said last-named brake levers being connected adjacent their ends to the associated brakes.

WALTER H. BASELT.